United States Patent [19]

Davis

[11] Patent Number: 4,610,142

[45] Date of Patent: Sep. 9, 1986

[54] APPARATUS AND METHOD FOR ADJUSTING A CURIE EFFECT TEMPERATURE SENSING SYSTEM

[75] Inventor: Charles L. Davis, Flower Mound, Tex.

[73] Assignee: Abbott Laboratories, North Chicago, Ill.

[21] Appl. No.: 662,875

[22] Filed: Oct. 19, 1984

[51] Int. Cl.[4] .................... H01H 51/00; G05D 23/00
[52] U.S. Cl. ........................................ 62/3; 219/495; 236/88; 335/146
[58] Field of Search ................... 236/88; 219/495; 335/149, 208, 45; 337/298; 62/3, 190

[56] References Cited

U.S. PATENT DOCUMENTS 4,004,259  1/1977  Krause ................... 335/146
4,121,184  10/1978  Dinkler ................... 335/146 X

FOREIGN PATENT DOCUMENTS 0763997  9/1980  U.S.S.R. ................... 335/146

OTHER PUBLICATIONS

Midwest Components Inc., Product Data, Section 700.

Primary Examiner—William E. Wayner
Attorney, Agent, or Firm—James L. Wilcox

[57] ABSTRACT

An apparatus and method for controlling the operating temperatures and differential temperature of a curie effect temperature sensing switch is disclosed. The temperature switch is adapted to provide temperature control of a cold plate in a reagent refrigerator. The temperature switch activates cold plate cooling devices when the cold plate temperature is above a first operating temperature and deactivates the cold plate cooling devices when the cold plate temperature is below a second operating temperature. An electromagnet is fixed external of and relative to the temperature switch so that the strength of the external magnetic field sets the operating temperatures of the temperature switch. A potentiometer is used to incrementally vary the current supplied to the electromagnet to thereby incrementally adjust the strength of the external magnetic field and the operating temperatures. A microprocessor may be provided to adjust the voltage supply of the potentiometer, which allows remote control of the operating temperatures. A second potentiometer is connected to the electromagnet so that it incrementally adjusts the current passed to the electromagnet as a function of whether the temperature switch is open or closed. Incremental adjustment of the second potentiometer provides incremental adjustment of the temperature differential. A monitor provides a warning signal if the temperature switch does not open and close within a predetermined time interval.

23 Claims, 7 Drawing Figures

# APPARATUS AND METHOD FOR ADJUSTING A CURIE EFFECT TEMPERATURE SENSING SYSTEM

BACKGROUND OF THE INVENTION

This invention relates to an apparatus and method for providing adjustment of the operating temperatures and temperature differential of a curie effect temperature sensing switch. In the presently preferred embodiment, this invention relates to an apparatus and method for controlling the temperature of a reagent refrigerator by using a curie effect temperature sensing switch and providing external, incremental adjustment of the temperature switch's operating temperatures and temperature differential.

Some reagents and other substances that are intended for medical diagnostic uses must be stored in a narrow temperature range. For example, some diagnostic reagents must be stored in a constant 2°–8° C. environment. Control of the reagent temperature is critical. If the reagent becomes too warm, its life may be shortened.

Refrigerating machines have been developed to provide a controlled temperature environment for such reagents. These machines typically include a cold plate on which the reagents rest and means for controlling the cold plate temperature. Thus, the cold plate temperature controls the reagent temperature.

In one conventional reagent refrigerator, temperature control is achieved by attaching a thermistor to the cold plate. The thermistor is set in an electrical circuit so that its resistance varies as a function of the cold plate temperature. Thus, the voltage across the thermistor corresponds to the temperature of the cold plate. This voltage signal is compared with a reference voltage signal representing the desired cold plate temperature. If the compared voltages are not the same, an error correction signal is generated to adjust the cold plate temperature. The magnitude and polarity of the error correction signal are used to keep the cold plate at its desired temperature.

This thermistor/servo controller provides adjustment of the cold plate temperature range so that the refrigerator can be easily adapted for a variety of reagents with different temperature requirements. Nevertheless, this type of temperature controller also has some substantial drawbacks. First, each temperature controller usually requires its own op-amp, microprocessor interface, and supporting circuitry. The final electrical configuration is expensive and complex. Second, this type of controller provides no fail-safe protection from fatal errors. If the microprocessor fails, is halted or turned off, so that no reference voltage signal is provided, the cold plate temperature can rise and ruin the reagents.

Curie effect temperature sensing switches offer an alternative to the thermistor/servo controller. These switches typically include a reed switch, intrinsic, permanent magnets, and a ferrite material. The reed switch opens or closes in response to changes in the strength of the magnetic field in the vicinity of the reed contact gap. The ferrite material exhibits high magnetic reluctance above a first operating temperature (also called a "curie temperature") and low magnetic reluctance below a second operating temperature. One manufacturer of curie effect temperature sensing switches, Midwest Components, Inc., suggests that these switches can replace thermally actuated devices in various applications where increased life is required or protection of the switching contacts from adverse environments is deemed desirable, such as corrosive liquid temperature control.

These type of switches, however, are not readily perceived as suitable for temperature control of diagnostic reagents. These switches are made with a fixed operating temperature and temperature differential. The temperature differential is usually around 4°–5° C., which is too high for many temperature control applications. Moreover, these switches are not provided with means for adjusting their operating temperatures and temperature differentials. Thus, a new temperature sensor arrangement with a different operating temperature must be specially adapted for every application having a different temperature requirement.

SUMMARY OF THE INVENTION

The present invention is directed to an apparatus and method for incrementally adjusting the operating temperature and temperature differential of a curie effect temperature sensor switch which may be used to control the temperature of a cold plate.

According to this invention, a variable strength magnetic field is produced extrinsic of and relative to the temperature switch so that the magnetic field can control the operating temperatures and temperature differential of the temperature switch. First means are provided for incrementally varying the strength of this magnetic field to adjust the operating temperatures. Second means are provided for incrementally varying the strength of the magnetic field as a function of whether the temperature switch is open or closed to adjust the temperature differential.

In the preferred embodiment, a curie effect temperature sensing switch is connected to means for cooling a reagent cold plate and thermally contacts the cold plate. The temperature switch activates the cooling means when the cold plate temperature exceeds the first operating temperature. The cooling means is deactivated by the temperature switch when the cold plate temperature falls below the second operating temperature. An electromagnet is fixed external of and relative to the temperature switch so that it produces an external magnetic field that will decrease the operating temperatures and temperature differential. A first potentiometer incrementally varies the current flowing to the electromagnet to control the strength of the magnetic field, and thereby adjusts the operating temperatures. A second potentiometer varies the current flowing to the electromagnet differentially as a function of whether the temperature switch is opened or closed to adjust the temperature differential. The first potentiometer also may be provided with a variable, external voltage source. Means for monitoring the rate at which the temperature switch activates and deactivates the cooling means is provided.

The present invention provides variable control of the operating temperatures of a curie effect temperature sensing switch. In addition, the differential temperature of the curie effect temperature switch may be variably controlled. This allows a curie effect temperature switch to be easily adapted for a variety of applications within its gross temperature range. Moreover, this object is attained by using a variable, extrinsic magnetic field, which at least one curie effect temperature sensing switch manufacture, Midwest Components, Inc., says should be avoided.

When applied to a reagent cold plate, the present invention provides convenient temperature control. The operating temperatures and the temperature differential can be easily adjusted for specific reagents. Moreover, the temperature controller for the cold plate is arranged to provide fail-safe protection. For example, if a microprocessor is used to vary the voltage source of the first potentiometer and the microprocessor fails, the curie effect temperature sensing switch will still control the cold plate within its original operating temperatures and temperature differential. In many cases, these temperature extremes will damage the reagents before the hardware problem can be identified and fixed. Finally, the present invention is a less expensive form of cold plate temperature control than the thermistor-type controller.

The invention itself, together with further objects and attendant advantages, will best be understood by reference to the following detailed description taken in conjunction with the drawings.

BRIEF DESCRIPTIION OF THE DRAWINGS

DETAILED DESCRIPTION OF A PREFERRED EMBODIMENT

Figure 1:
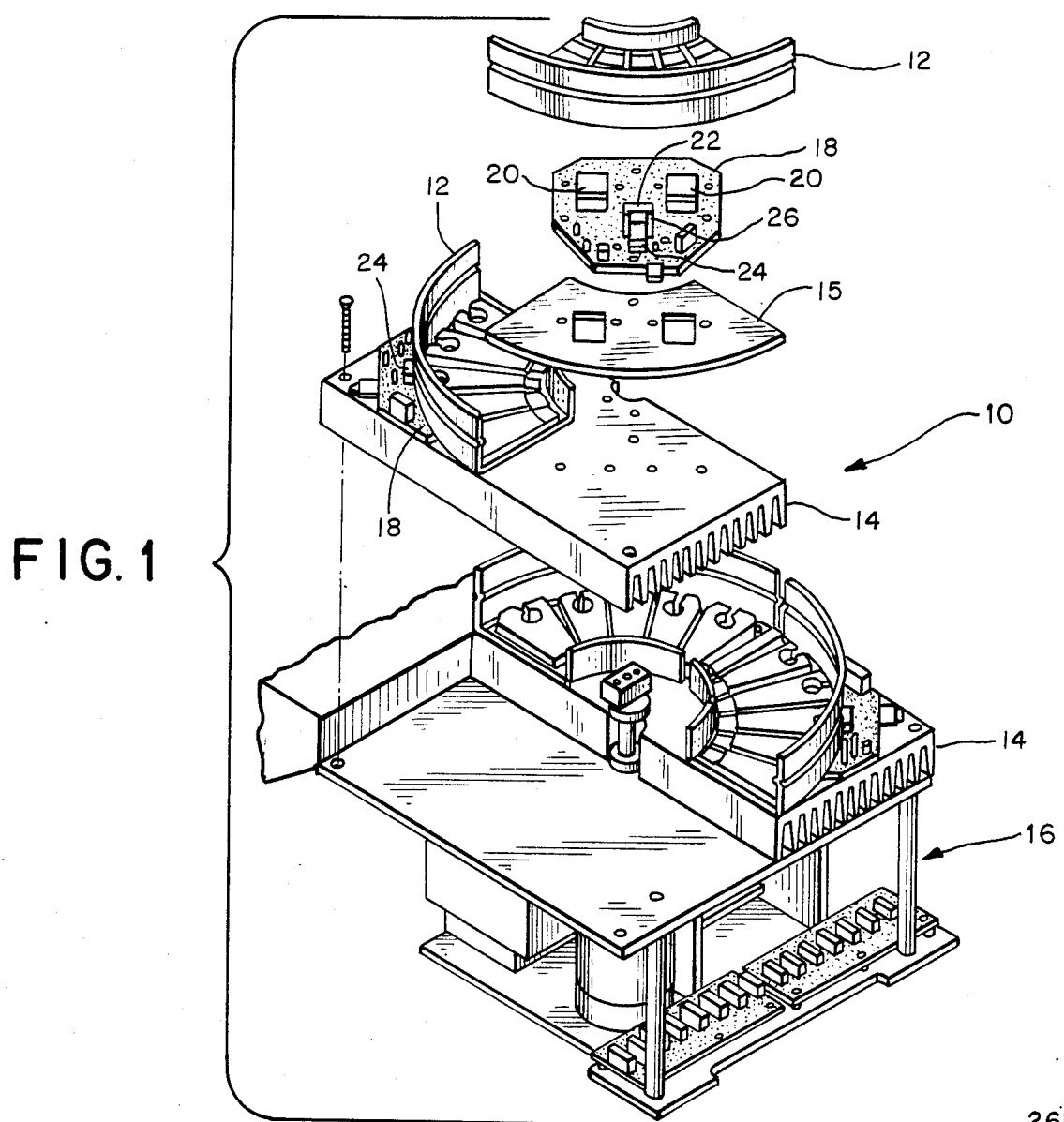
FIG. 1 is a partially exploded view of a reagent refrigerator which incorporates a presently preferred embodiment of the present invention.

Referring now to the drawings, FIG. 1 shows a reagent refrigerator machine 10 which is adapted to utilize the preferred embodiment of the present invention. The refrigerator is comprised of four cold plate quadrants 12. Containers of diagnostic reagents or similar substances are placed on the cold plate quadrant 12 to control the temperature of the reagents. Each cold plate quadrant 12 is mounted above an extruded aluminum heat sink 14 separated by an insulation material 15. This cold plate/heat sink assembly is secured to the base unit 16. The cold plates 12, heat sink 14 and base unit 16 are all conventional components of an existing reagent refrigerator made by Abbott Laboratories. Their structures and functions will be readily understood by those skilled in the relevant art. The insulation material 15 is presently made of an ethylene foam.

Figures 2, 3A, 3B:
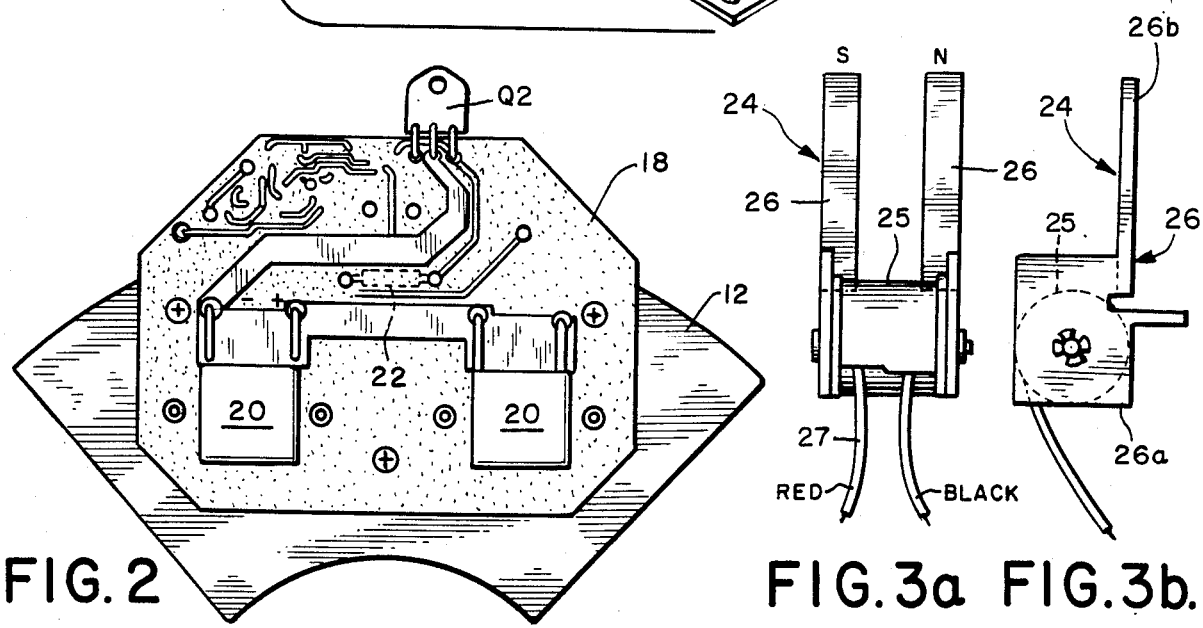
FIG. 2 is a plan view of a reagent cold plate quadrant of the reagent refrigerator of FIG. 1.
FIGS. 3a and 3b are a plan view and side view, respectively, of the electromagnet used with the preferred embodiment of FIGS. 1 and 2.

As shown in FIGS. 1 and 2, a printed circuit board 18 is mounted between the underside of each cold plate quadrant 12 and the insulation material 15. Thus, there are four such printed circuit boards for the refrigerator 10. Except as indicated below, each printed circuit board 18 is identical in structure and function.

Each printed circuit board 18 is provided with two Thermo-Electronic Modules (hereinafter "TEMs") 20 and circuitry for controlling the TEMs. The TEMs are commercially available, electronically controlled devices which generate heating or cooling depending on their polarity. The presently preferred embodiment of the invention uses Melcor's Thermo-Electronic Module, model number CP2-31-10L. These TEMs 20 are mounted in the printed circuit board 18 so that their upper surfaces may contact the underside of the cold plate 12 and their bottom surfaces may contact the heat sink 14. It is preferred that the upper surfaces are epoxied to the underside of the cold plate 12 using a thermal epoxy, such as Thermalloy "Thermal Bond" #4953. Holes are cut in the insulation material 15 so that the bottom surfaces of the TEMs may directly contact the heat sink 14. The polarity of the TEMs 20 is set so that they will provide cooling to the cold plate quadrant 12 when they are activated as described below.

The circuitry for controlling the TEMs 20 includes a curie effect temperature sensing switch (hereinafter "CETSS") 22. The CETSS 22 is mounted on the printed circuit board 18 and epoxied directly to the underside of the cold plate 12. It is preferred that the Thermalloy "Thermal Bond" #4953 epoxy is used so that the CETSS 22 is in thermal contact with the cold plate 12. In the present embodiment, a portion of the underside of the cold plate quadrant 12 has been milled out so that the cold plate is in close contact with the CETSS 22.

The preferred embodiment of the invention uses a CETSS made by Midwest Components, Inc., Muskegon, Mich., model nos. TS-12B or TS-30B. TS-12B has a nominal curie temperature of 12° C., and TS-30B has a nominal curie temperature of 30° C. It should be understood, however, that other types of CETSS may be used within the scope of the present invention. For purposes of this application, a CETSS is defined as a temperature sensing switch having the following characteristics. The CETSS includes a set of contacts, an intrinsic, permanent magnet, and a ferrite material. The ferrite exhibits high magnetic reluctance above its curie temperature and low magnetic reluctance below its curie temperature. The CETSS opens and closes in response to changes in strength of a magnetic field in the vicinity of the contacts. Thus, the CETSS changes state as its ferrite material crosses its curie temperature. For further explanation of a CETSS, the reader is directed to Midwest Products, Inc.'s *"Product Data*, Section 7000" brochure, which is incorporated by reference herein.

It should be understood that a CETSS actually has two curie temperatures—one at which the CETSS opens and one at which the CETSS closes. This results in a classic hysteresis. The CETSS will be referred to as in its "open" or "off" condition when it senses a temperature above its first curie temperature and in its "closed" or "on" condition when it senses a temperature below its second curie temperature. In the CETSS 22 presently used, the first curie temperature is a few degrees higher than the second curie temperature. Thus, when the CETSS 22 is closed, it will not open until its sensed temperature exceeds the first curie temperature. Conversely, when the CETSS 22 is open, it will not close until it senses a temperature below the second curie temperature. In this specification the term operating temperature will be used interchangeably with the term curie temperature.

Another term that will be used herein is temperature differential, which is another characteristic of a CETSS. The temperature differential refers to the difference between the first and second operating temperatures. The reader is again referred to the "Product Data, Section 7000" brochure for further explanation of the temperature differential.

An electromagnet 24 is also mounted on the printed circuit board 18. As shown in FIGS. 3a and 3b, the electromagnet 24 includes a cylindrical-shaped core 25. The core 25 is presently maded of C.R. steel with a cadmium plated (type II) finish. An arm 26 is mounted on each end of the core 25. Each arm 26 has a square section 26a to which the core 25 is attached and a flat free end 26b which extends outwardly from the core. The core 25 is wrapped with a wire 27 between the square ends 26a of the arms 26. The core 25 is presently wrapped with 1200 turns of #36 gauge wire in a conventional manner such that the right-hand arm 26 in FIG. 3a becomes magnetically north upon connection of positive voltage to the red wire 27. The average strength of the magnetic field produced by the electromagnet 24 will then be set by the amount of current passed to the wire 27.

Referring now to FIG. 1, the electromagnet 24 is mounted on the upper side of the printed circuit board 18. It is preferred that the electromagnet 24 is fixed on the printed circuit board 18 so that the core 25 is outside of, and not underneath, the cold plate quadrant 12. The flat free ends 26b of the arms 26 should run between the printed circuit board 18 and the cold plate 12 so that the outer edges of the free ends 26b abut, or are close to, the CETSS 22.

In this embodiment, the electromagnet 24 is polarized and mounted on the printed circuit board 18 so that the operating temperatures of the CETSS 22 drop with increasing current flow through the electromagnet. In other words, the electromagnet 24 produces a variable strength magnetic field external of and relative to the CETSS 22 that supports the intrinsic magnetic field of the CETSS 22. The strength of this external magnetic field sets both the first and second operating temperatures of the CETSS 22. For example, increasing the current flowing through the electromagnet 24 increases the strength of the external magnetic field, which decreases both the first and second operating temperatures equally.

The electromagnet 24 is fixed on the printed circuit board 18 with respect to the CETSS 22 so that the strength of the external magnetic field only varies as a function of current flowing through the electromagnet 24. It should be understood, however, that other means for producing a magnetic field extrinsic to the CETSS may also be used within the scope of this invention. For example, a solenoid could be wrapped directly around the outside of the CETSS or inside the CETSS enclosure. What is important is that a variable strength magnetic field is produced extrinsic of and relative to the CETSS to control the operating temperatures and temperature differential.

Figure 4:
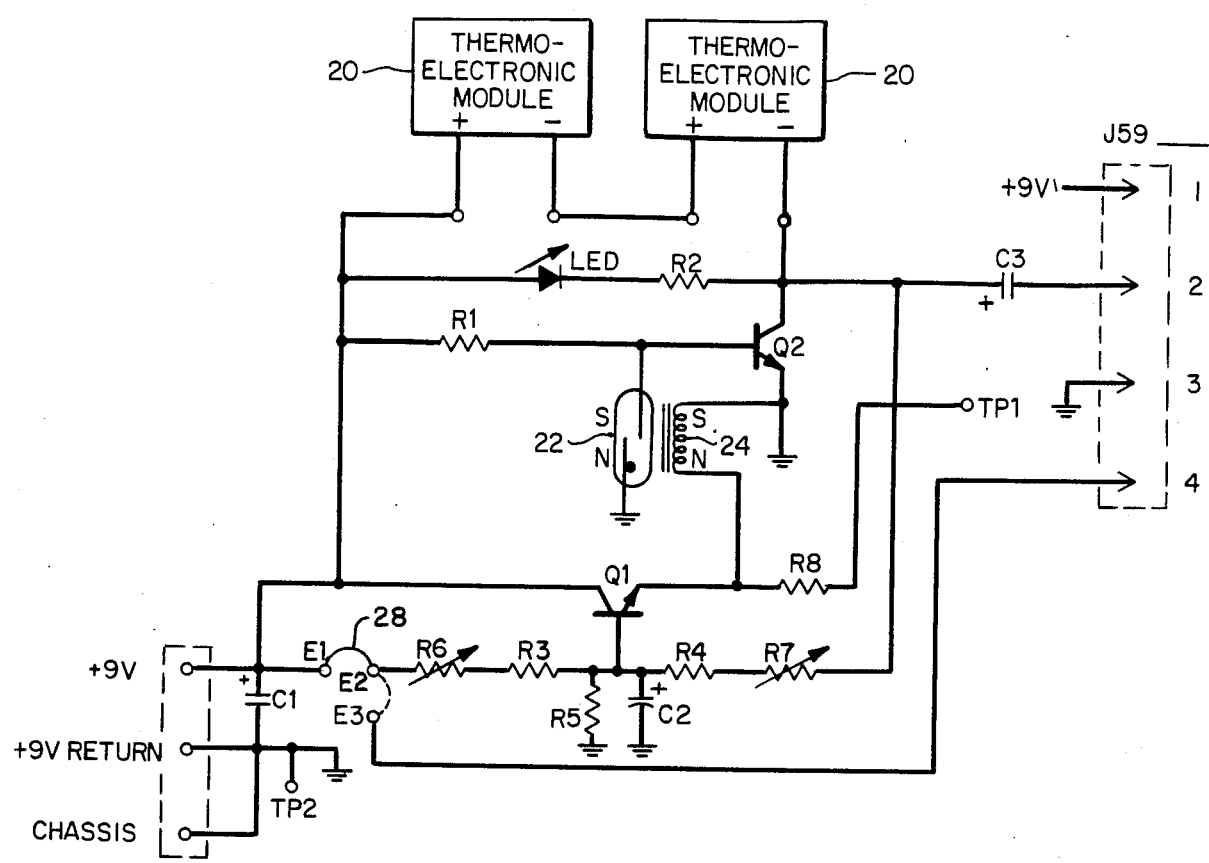
FIG. 4 is circuit diagram of a temperature controller for the reagent cold plate of FIGS. 1 and 2.

FIG. 4 shows the electrical connections for the CETSS 22, TEMs 20, electromagnet 24 and supporting circuitry. The components in FIG. 4 are depicted and connected in a conventional manner, and component values are listed below. One skilled in the relevant art could reproduce the circuit with ordinary skill. Thus, the following discussion will be limited to the operation of the circuit in FIG. 4.

The TEMs 20 are oriented to provided cooling to the cold plate 12 when they are activated by a voltage source. The CETSS 22 is electrically connected to the TEMs 20 to control their operation. When the CETSS is closed and the cold plate temperature sensed by the CETSS is below the first operating temperature, transistor Q2 is open, and its collector is at the same 9 volt potential of the supply voltage. The TEMs 20 are deactivated because there is no voltage drop across their terminals.

When the cold plate temperature sensed by the CETSS 22 exceeds the first operating temperature, the CETSS opens. Thus, transistor Q2 saturates and brings its collector potential down to about 1.3 volts. The TEMs 20 are now activated because there is a 7.7 volt drop across their terminals. An indicator circuit comprised of an LED and resistor R2 is connected in parallel with the TEMs 20 to provide an indicator light when the TEMs are activated.

The polarity of the electromagnet 24 is set to produce a variable strength external magnetic field which supports the intrinsic field of the CETSS 22. The circuitry defined by potentiometers R6,R7, resistors R3–R5 and transistor Q1 provides incremental adjustment of the strength of the external magnetic field and, thus, of the first and second operating temperatures and temperature differential.

Incremental adjustment of the operating temperatures and temperature differential will now be explained. With the jumper wire 28 connected between terminals E1 and E2, a constant 9 volts is supplied to a first voltage divider network formed by the first potentiometer R6 and resistors R3 and R5. By adjusting the first potentiometer R6, the current supplied to the electromagnet 24 via transistor Q1 can be adjusted incrementally. Thus, the strength of the magnetic field produced by electromagnet 24 and the first and second operating temperatures of the CETSS 22 are incrementally adjusted thereby. In practice, it is preferred that the first potentiometer R6 is initially set at its maximum resistance. Then, as this potentiometer R6 is gradually adjusted downward, the strength of the external magnetic field is gradually increased and the first and second operating temperatures of CETSS 22 are gradually decreased in equal increments.

It should be clear from the foregoing that incremental adjustment of the strength of the extrinsic magnetic field and, thereby, the operating temperatures includes both analog and digital incremental adjustment. Indeed, the potentiometer R6 and R7 provide analog, incremental adjustment. The term incremental adjustment, in the context of this application, refers to the continuous and intentional, or controlled, adjustment of a variable (e.g. operating temperatures) over a range of values, as opposed accidental, spurious, or random adjustment of the variable.

When the jumper wire 28 is connected between the terminals E2 and E3, the supply voltage for the first voltage divider may be controlled remotely. It is contemplated that the first potentiometer R6 will be used for local, gross adjustment of the operating temperatures in the manner described in the preceding paragraph. However, the supply voltage the first potentiometer R6 may be controlled remotely, for example, by a microprocessor, to provide fine calibration of the current supplied to the electromagnet 24 and, thus, of the operating temperatures.

A second voltage divider network defined by resistors R4, R5 and second potentiometer R7 is designed to control the temperature differential of CETSS 22. Second potentiometer R7 is also adjusted to control the current passed to the electromagnet 24. However, the second voltage divider varies the current passed to the electromagnet 24 differentially as a function of whether the CETSS 22 is in its open or closed condition since the collector of transistor Q2 is the supply voltage of the second potentiometer R7. When the CETSS 22 is open, transistor Q2 is saturated and its collector is at approximately 1.3 volts. Thus, the amount of current that the second voltage divider can supply to the electromagnet 24 is not large enough to appreciably affect the temperature differential, even if the second potentiometer R7 is at its minimum resistance. When the CETSS 22 closes, transistor Q2 turns off and its collector rises to 9 volts. The second potentiometer R7 can then be incrementally adjusted to vary the flow of current to the electromagnet 24, and thereby incrementally adjust the temperature differential.

In practice, it is preferred that the second potentiometer R7 is initially set at its maximum resistance and gradually adjusted downward. The differential current flowing to the electromagnet 24 and the differential strength of the extrinsic magnetic field will then be gradually increased, which will gradually decrease the temperature differential. The second potentiometer R7 should be decreased in increments, and the temperature differential measured at each increment. Further adjustment of the potentiometer R7 can then be made until the desired temperature differential is achieved. The temperature differential can be determined by measuring the cold plate temperature with an ordinary thermometer and observing the maximum and minimum temperatures.

The other components in FIG. 4 will now be explained. The J59 connector represents one of the connectors J590, J591, J592 or J593, which are standard parts on the existing reagent refrigerator 10 made by Abbott Laboratories. Pin 4 of the J59 connector is provided for external control of the voltage source of the first potentiometer R6. Capacitor C1 is used for filtering and resistor R1 is a pull up resistor. Test points TP1 and TP2 are provided for measuring references voltages. Resistor R8 protects the transistor Q1 from being shorted out while probing test point TP1.

Capacitor C2 is designed to damp any oscillations which may occur if the temperature differential is set too low. If the CETSS 22 opens and closes at the same operating temperature, the system will oscillate. Put another way, the second voltage divider is polarized to provide positive feedback. Oscillations will occur if there is too much gain.

Figure 5:
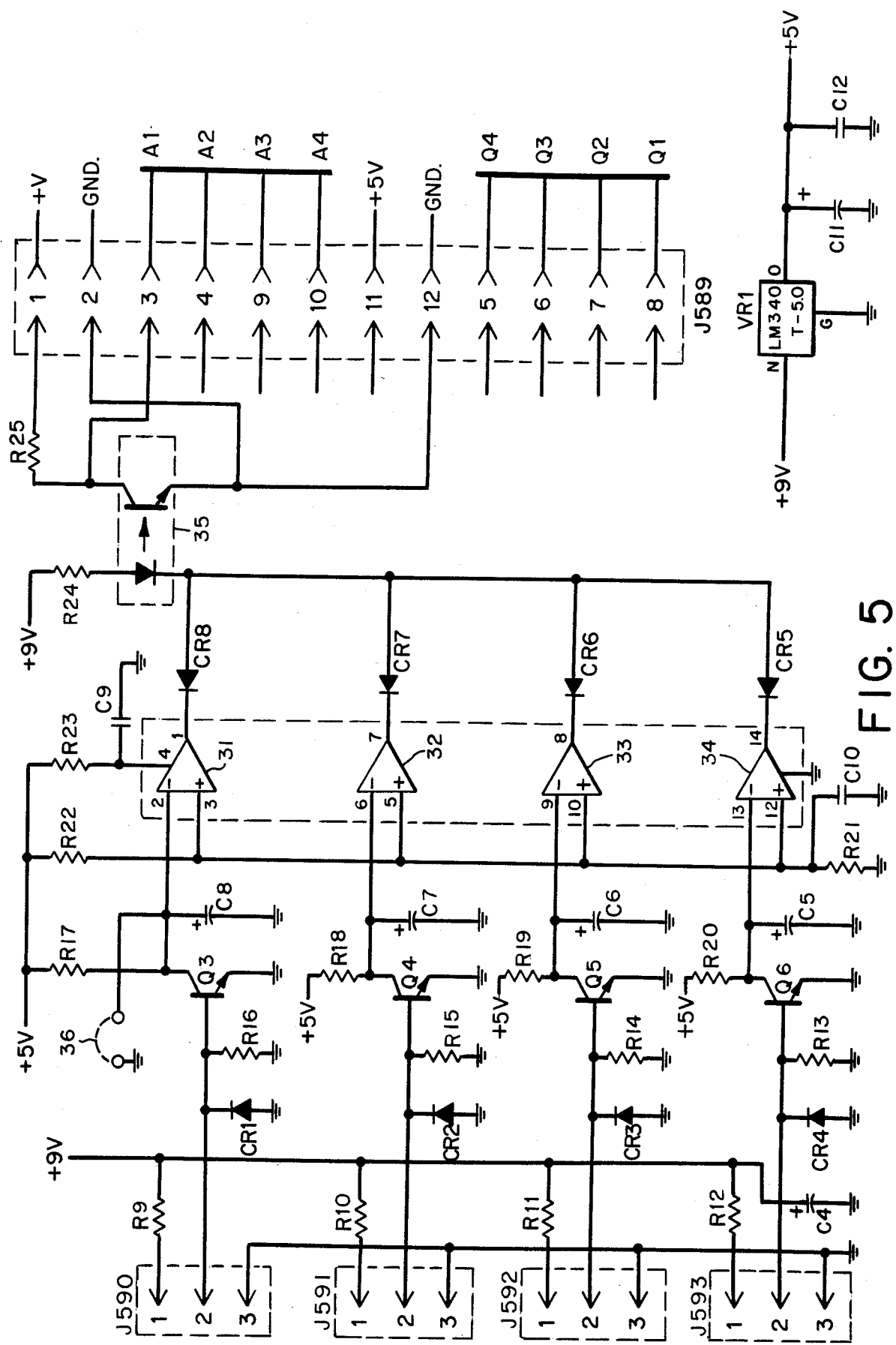
FIG. 5 is a circuit diagram of a monitor warning system for the temperature controller of FIG. 4.

Capacitor C3 couples the temperature control circuitry shown in FIG. 4 with the monitor circuitry shown in FIG. 5. A positive-going pulse is generated by capacitor C3 every time the CETSS 22 switches from its open condition to its closed condition. A negative-going pulse is generated by capacitor C3 every time the CETSS 22 switches from its closed condition to its open condition. When the temperature control circuitry shown in FIG. 4 is working properly, the CETSS 22 should switch between its open and closed conditions at regular intervals. The room temperature and the heat generated by the base unit 16 will constantly tend to raise the reagent temperature above the first operating temperature, which will cause the TEMs 20 to be activated until the reagent temperature falls back below the second operating temperature.

The circuitry shown in FIG. 5 is designed to monitor the rate of positive-going pulses generated by capacitor C3. If a positive-going pulse is not generated (i.e. the CETSS 22 does not open and close) about every 2 minutes, a warning signal will be generated. No warning signal is generated if a positive-going pulse is generated regularly.

The circuitry shown in FIG. 5 will monitor the temperature control circuitry for all four cold plate quadrants 12 of the reagent refrigerator 10. Capacitor C3 of the first cold plate temperature controller connects to terminal 2 of connector J590, and a similar capacitor of the second cold plate temperature controller connects to terminal 2 of the connector J591, etc. Since the monitor circuitry for each cold plate quadrant is identical, except as indicated below, only the circuitry associated with connector J590 will be discussed. Moreover, the discussion will be limited to the operation of the circuitry since the electrical components are depicted and connected in a conventional manner that one skilled in the relevant art would readily understand.

When the CETSS 22 is steady in closed or open condition, resistor R16 discharges capacitor C3 and turns off transistor Q3. Capacitor C8 then charges very slowly towards 5 volts via resistor R17. When the CETSS 22 changes from closed to open, a negative-going pulse is generated. Diode CR1 arrests all negative-going pulses. When the CETSS 22 goes from open to closed condition, a 7.5 volt positive-going pulse is generated which turns on transistor Q3. The charge on capacitor C8 then discharges to approximately 1 volt through transistor Q3. The transistor Q3 shuts off again as the positive-going pulse at its base is dissipated by resistor R16. The charge on capacitor C8 then builds towards 5 volts again until it is discharged by another positive-going pulse at pin 2 of connector J590.

Capacitor C8 is also connected to the negative input of a comparator 31. The positive input of the comparator is set at 3.2 volts by a 5 volt source and resistors R21 and R22. When the charge on capacitor C8 is less than 3.2 volts, the output of the comparator 31 will be high. Diode CR8 will then be nonconducting. When capacitor C8 rises above 3.2 volts, however, the comparator 31 output is negative and diode CR8 conducts. The opto-isolator 35 will then be activated and generate a warning signal which is sent to port A1 of a microprocessor.

Thus, if the charge on capacitor C8 is not discharged by a positive-going pulse before capacitor C8 reaches 3.2 volts, which takes a several minutes, a warning signal will be generated. Moreover, the outputs of all the comparators 31-34 are tied together, via diodes CR5-CR8, to form an OR gate. If the output from any comparator 31-34 goes low, the opto-isolator 35 will generate a warning signal. Thus, the circuitry shown in FIG. 5 will produce a warning signal when any one of the CETSS 22 of the four cold plate quadrants 12 does not activate and deactivate the TEMs 20 within a predetermined time interval.

The other components which comprise the monitor circuitry associated with connector J590 will now be described. Resistors R9-12 are current sharing resistors for the 9 volt power supplies. These power supply voltages are supplied via the temperature control circuitry for each of the four cold plate quadrants 12. Capacitors C4 and C10 are low pass filters. Each connector J590-J593 is the same connector J59 shown in FIG. 4 for one cold plate quadrant. Terminals 4 of the four input connectors J590-J593, which are provided for external connection, are not shown in FIG. 5.

A jumper wire 36 may be provided for the monitor circuitry associated with connector J590. This jumper wire 36 shorts out capacitor C8 so that no warning signal is provided for this cold plate quadrant. A warning signal will still be produced for the other three cold plate quadrants in the manner described above.

The jumper wire 36 is provided because the monitor circuitry shown in FIG. 5 is designed for a reagent refrigerator 10 with a 28° C. operating temperature CETSS 22 for the first cold plate quadrant (i.e. associated with connector J590) and 12° C. operating temperature CETSS for the other three cold plate quadrants. The first cold plate quadrant is intended to store reagents which may be kept around room temperature but not higher. When no such reagents will be stored, the jumper wire 36 is connected from capacitor C8 to ground to disable the monitor circuitry associated with that cold plate quadrant. When normal reagents will be stored in the first cold plate quadrant, the jumper wire 36 is removed, and the monitor circuitry associated with the first cold plate quadrant will work in the manner described above.

All four comparators 31–34 are part of a single IC (integrated circuit) component LF347 shown by the dashed lines in FIG. 5. The resistor R23 and capacitor C9 are connected to the comparator IC to filter high frequency noise. This filtering keeps the comparators stable by preventing oscillation. The opto-isolator 35 (type 4N33) is used to isolate the microprocessor from the noisy electrical environment in the reagent refrigerator. Resistor R24 limits the current passed to the opto-isolator 35 LED. Resistor R25 pulls up the signal output the from opto-isolator 35 and input into microprocessor port bit A1. Connector J589 is another standard connector on the reagent refrigerator 10 presently made by Abbott Laboratories. Terminals 4–10 are connected to microprocessor port bits A2–A4 and Q1–Q4, which are not used with the present embodiment of the invention.

A voltage regulator circuit is shown in the lower right hand corner of FIG. 5. This circuit provides a stable 5 volt supply for the monitor circuitry shown in FIG. 5.

Figure 6:
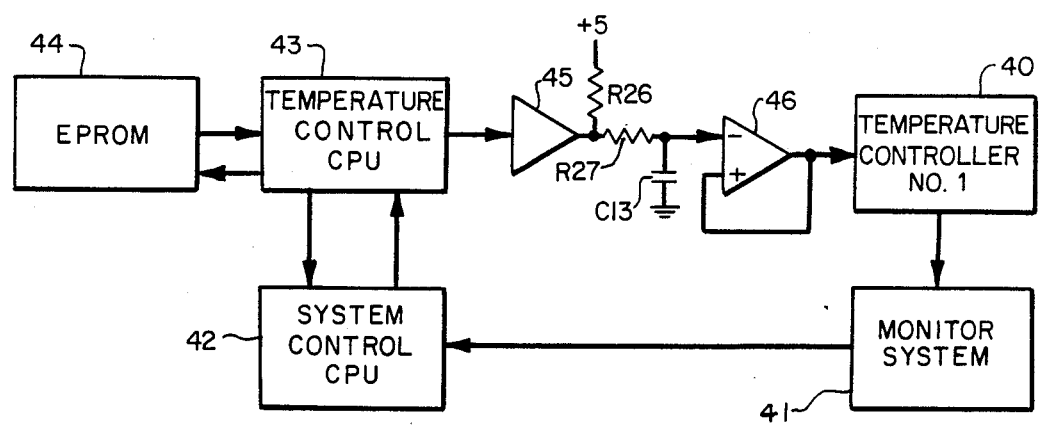
FIG. 6 is a block diagram of the recently preferred control system for the reagent refrigerator of FIG. 1.

FIG. 6 illustrates the control system presently contemplated for the reagent refrigerator 10 embodying the present invention. The temperature controller 40 represents the temperature control circuitry for one cold plate quadrant as shown in FIG. 4. The monitor system 41 represents the circuitry in FIG. 5.

An operator may initiate a command to adjust the operating temperatures of the CETSS for a cold plate quadrant via a system control CPU 42. Any existing system CPU may be adapted for this purpose. The commands from the system CPU 42 are input to the temperature control CPU 43. The operating instructions for the control CPU 43 will be stored in an EPROM memory 44. The control CPU 43 outputs an instruction as a pulse width modulated signal. The buffer 45, op-amp 46, resistors R26, R27 and capacitor C13 are provided to convert the pulse width signal to a DC signal which is input to the first potentiometer R6 of the temperature controller 40. The magnitude of the DC signal will be determined by the width of the pulse signal from the temperature control CPU 43.

Only the temperature controller 40 for the first cold plate quadrant is shown. In practice, there will be one such temperature controller for each cold plate quadrant 12, a control CPU 43 output channel for each temperature controller, and pulse width signal conversion circuitry for each such output channel.

The control CPU 43 also outputs error signals to the system CPU 42. The control CPU 43 will be provided with a stable voltage supply, a clock signal, and power on reset signal in a conventional manner. A series of flip-flops should be interfaced between the system CPU 42 and control CPU 43 to synchronize the signals output to the control CPU 43 from the system CPU 42. Opto-isolators should be provided for the input and output between the control CPU 43 and the system CPU 42.

The circuits disclosed in FIGS. 4–6 are intended to be exemplary and not limiting. A table of exemplary values for the components shown in FIGS. 4–5 is set out below. Other types of circuits could be readily adapted by one skilled in the art to perform the same functions and obtain the same results as the components shown in FIGS. 4 and 5.

TABLE

| | |
|---|---|
| $R_1$ | 390 ohms |
| $R_2$ | 390 ohms |
| $R_3$ | 390 ohms |
| $R_4$ | 390 ohms |
| $R_5$ | 1K ohms |
| $R_6$ | 10K pot. |
| $R_7$ | 10K pot. |
| $R_8$ | 390 ohms |
| $R_9$ | 10 ohms |
| $R_{10}$ | 10 ohms |
| $R_{11}$ | 10 ohms |
| $R_{12}$ | 10 ohms |
| $R_{13}$ | 10K ohms |
| $R_{14}$ | 10K ohms |
| $R_{15}$ | 10K ohms |
| $R_{16}$ | 10K ohms |
| $R_{17}$ | 10M ohms |
| $R_{18}$ | 10M ohms |
| $R_{19}$ | 10M ohms |
| $R_{20}$ | 10M ohms |
| $R_{21}$ | 10K ohms |
| $R_{22}$ | 5.6K ohms |
| $R_{23}$ | 27 ohms |
| $R_{24}$ | 220 ohms |
| $R_{25}$ | 5.6K ohms |
| $C_1$ | 0.1 $\mu$F |
| $C_2$ | 2.2 $\mu$F (35 V) |
| $C_3$ | 2.2 $\mu$F (35 V) |
| $C_4$ | 33 $\mu$F (50 V) |
| $C_5$ | 33 $\mu$F (50 V) |
| $C_6$ | 33 $\mu$F (50 V) |
| $C_7$ | 33 $\mu$F (50 V) |
| $C_8$ | 33 $\mu$F (50 V) |
| $C_9$ | 0.1 $\mu$F |
| $C_{10}$ | 0.1 $\mu$F |
| $C_{11}$ | 1 $\mu$F (35 V) |
| $C_{12}$ | 0.1 $\mu$F |
| $Q_1$ | TIP110 |
| $Q_2$ | TIP140 |
| $Q_3$ | 2N2222A |
| $Q_4$ | 2N2222A |
| $Q_5$ | 2N2222A |
| $Q_6$ | 2N2222A |
| CR1–CR8 | 1N914 |

It follows from the foregoing description that the present invention overcomes some significant shortcomings of the prior art. The present invention provides external, incremental (trim) adjustment of the operating temperatures and temperature differential of a CETSS. Moreover, the present invention proceeds contrary to conventional thinking and uses an extrinsic magnetic field to provide such control. A CETSS controlled in this manner may then be used to provide external, adjustable control of a reagent refrigerator cold plate. The present invention also provides fail-safe protection. If the remote microprocessor control or extrinsic trim circuitry fails, the CETSS is set up to keep the cold plate temperature below the curie temperature, which will not ruin many diagnostic reagents.

It should be understood that various changes and modifications to the preferred embodiment described above will be apparent to those skilled in the art. For example, the present invention can be adapted to control the temperature of a hot plate in the same fashion described above for a cold plate. The present invention could also be adapted for a CETSS-type switch which closes above a first operating temperature and opens below a second, lower operating temperature. The potentiometers R6 and R7 can be replaced by any other device which can incrementally vary the current passed to the extrinsic electromagnet.

It is intended that the foregoing description be regarded as illustrative rather than limiting, and that it be understood that it is the following claims, including all equivalents, which are intended to define the scope of this invention.

I claim:

1. An apparatus for providing adjustment of the operating temperatures and temperature differential of a curie effect temperature sensing switch, the temperature switch having a closed condition and an open condition, comprising:

means for producing a magnetic field of variable strength extrinsic of and relative to the temperature switch such that the operating temperatures and the temperature differential of the temperature switch can be controlled by the magnetic field produced by the magnetic field means;

first means for incrementally varying the strength of the magnetic field produced by the magnetic field means to adjust the operating temperatures of the temperature switch; and second means for incrementally varying the strength of the magnetic field produced by the magnetic field means as a function of the temperature switch condition to adjust the temperature differential of the temperature switch.

2. The invention of claim 1 wherein the magnetic field means includes an electromagnet having a core surrounded by a coil of wire through which an electric current is passed.

3. The invention of claim 2 wherein the first varying means includes first means for changing the amount of current passed to the electromagnet.

4. The invention of claim 3 wherein the second varying means includes second means for differentially changing the amount of current passed to the electromagnet.

5. The invention of claim 3 wherein the first varying means further includes a variable external voltage source.

6. In an apparatus for controlling the temperature of a cold plate including means for cooling the cold plate, the improvement comprising:

a curie effect temperature sensing switch having first and second operating temperatures, a temperature differential, a closed condition, and an open condition, the temperature switch thermally contacting the cold plate and operatively connected to the cooling means;

the temperature switch activating the cooling means when the temperature of the cold plate is above the first operating temperature and deactivating the cooling means when the temperature of the cold plate is below the second operating temperature;

means for producing a magnetic field of variable strength extrinsic of and relative to the temperature switch such that the operating temperatures and the temperature differential can be controlled by the magnetic field produced by the magnetic field means;

first means for incrementally varying the strength of the magnetic field produced by the magnetic field means to adjust the operating temperatures; and second means for incrementally varying the strength of the magnetic field produced by the magnetic field means as a function of whether the temperature switch is in its open or closed condition to adjust the temperature differential.

7. The invention of claim 6 wherein the magnetic field means includes an electromagnet.

8. The invention of claim 7 wherein the electromagnet includes a core surrounded by a coil of wire through which electrical current is passed and two arms, each arm being attached at one of its ends to the core and having its free end extending outwardly from the core, and the core being fixed near the cold plate so that the free ends of the arms may abut the temperature switch.

9. The invention of claim 8 wherein the first varying means includes first means for changing the amount of current passed through the coil.

10. The invention of claim 9 wherein the second varying means includes second means for differentially changing the amount of current passed through the coil.

11. The invention of claim 8 wherein the first varying means further includes a variable, external voltage source.

12. The invention of claim 10 further comprising means for monitoring the rate at which the temperature switch activates and deactivates the cooling means.

13. In an apparatus for controlling the temperature of reagents or other substances including a cold plate on which the reagents or other substances rest and electrically controlled means for cooling the cold plate, the improvement comprising:

a curie effect temperature sensing switch having first and second operating temperatures, a temperature differential, an open condition and a closed condition, the temperature switch thermally contacting the cold plate and electrically connected to the cooling means;

the temperature switch activating the cooling means when the temperature of the cold plate is above the first operating temperature and deactivating the cooling means when the temperature of the cold plate is below the second operating temperature;

means for producing a magnetic field of variable strength, the magnetic field means fixed external of and relative to the temperature switch such that the operating temperatures and the temperature differential are decreased by the magnetic field produced by the magnetic field means;

first means for incrementally increasing the strength of the magnetic field produced by the magnetic field means to decrease the operating temperatures; and second means for incrementally increasing the strength of the magnetic field produced by the magnetic field means as a function of whether the temperature switch in its open or closed condition to decrease the temperature differential.

14. The invention of claim 13 wherein the magnetic field means includes an electromagnet.

15. The invention of claim 14 wherein the electromagnet includes a core of magnetic material surrounded by a coil of wire through which current flows and two arms, each arm being attached at one of its ends to the core and having its free end extending outwardly from the core, and the core being mounted near the cold plate so that the free ends of the arms may abut the temperature switch.

16. The invention of claim 15 wherein the first increasing means includes first means for varying the amount of current flowing through the coil.

17. The invention of claim 16 wherein the second increasing means includes second means for differentially varying the amount of current flowing through the coil.

18. The invention of claim 17 wherein the first and second current varying means include first and second potentiometers which are coupled together at the base of a transistor, the transistor being connected to the coil.

19. The invention of claim 18 wherein the first varying means further includes a variable, external voltage source.

20. The invention of claim 13 further comprising means for monitoring the rate at which the temperature switch activates and deactivates the cooling means.

21. A method for adjusting the operating temperatures and the temperature differential of a curie effect temperature sensing switch having an on condition and an off condition comprising:

producing a magnetic field of variable strength extrinsic of and relative to the temperature switch such that the operating temperatures and the temperature differential of the temperature switch can be controlled by the extrinsic magnetic field;

incrementally varying the strength of the extrinsic magnetic field to adjust the operating temperatures of the temperature switch; and incrementally varying the strength of the extrinsic magnetic field as a function of the temperature switch condition to adjust the temperature differential of the temperature switch.

22. A method for controlling the temperature of a cold plate having a cooling element operatively connected to a curie effect temperature sensing switch, the temperature switch also being in thermal contact with the cold plate and having first and second operating temperatures and a temperature differential, comprising:

activating the cooling element when the temperature of the cold plate is above the first operating temperature;

deactivating the cooling element when the temperature of the cold plate is below the second operating temperature;

using an electromagnet to produce a magnetic field of variable strength external of and relative to the temperature switch such that the operating temperatures and the temperature differential can be controlled by the external magnetic field;

incrementally varying the current flowing to the electromagnet to adjust the operating temperatures; and incrementally changing the current flowing to the electromagnet to alter the strength of the external magnetic field as a function of whether the temperature switch is activating or deactivating the cooling element to adjust the temperature differential.

23. The invention of claim 22 further comprising the step of monitoring the rate at which the temperature switch activates and deactivates the cooling element.

* * * * *